US012694759B2

(12) United States Patent
Nelson et al.

(10) Patent No.: US 12,694,759 B2
(45) Date of Patent: Jul. 28, 2026

(54) LEADERBOARD PROMOTIONS FOR GAMING SYSTEMS

(71) Applicant: IGT, Las Vegas, NV (US)

(72) Inventors: Dwayne R. Nelson, Las Vegas, NV (US); Patrick Danielson, Las Vegas, NV (US); Cameron Filipour, Las Vegas, NV (US)

(73) Assignee: IGT, Las Vegas, IL (US)

( * ) Notice: Subject to any disclaimer, the term of this patent is extended or adjusted under 35 U.S.C. 154(b) by 0 days.

(21) Appl. No.: 18/521,036

(22) Filed: Nov. 28, 2023

(65) Prior Publication Data

US 2024/0096180 A1 Mar. 21, 2024

Related U.S. Application Data

(63) Continuation of application No. 17/991,646, filed on Nov. 21, 2022, now Pat. No. 11,854,350, which is a continuation of application No. 16/918,766, filed on Jul. 1, 2020, now Pat. No. 11,521,466, which is a continuation of application No. 16/056,035, filed on Aug. 6, 2018, now abandoned.

(51) Int. Cl.
*G07F 17/32* (2006.01)
*G06Q 50/34* (2012.01)

(52) U.S. Cl.
CPC ......... *G07F 17/3276* (2013.01); *G06Q 50/34* (2013.01); *G07F 17/3211* (2013.01); *G07F 17/3258* (2013.01); *G07F 17/3267* (2013.01)

(58) Field of Classification Search
None
See application file for complete search history.

(56) References Cited

U.S. PATENT DOCUMENTS 7,704,144 B2 4/2010 Abbott
7,931,531 B2 4/2011 Oberberger
8,430,735 B2 4/2013 Oberberger
8,845,437 B2 9/2014 Lim et al.
9,919,222 B1 3/2018 Curtis et al.
2006/0178187 A1* 8/2006 Walker .................... G07F 17/32 463/16
2008/0076527 A1 3/2008 Low et al.
2008/0108406 A1 5/2008 Oberberger
2008/0108425 A1* 5/2008 Oberberger ......... G07F 17/3255 463/25
2009/0104960 A1* 4/2009 Kelly .................. G07F 17/3267 463/16
2012/0136465 A1* 5/2012 Guinn ................. G07F 17/3276 700/92
2013/0029739 A1* 1/2013 Ramsey .............. G07F 17/3276 463/31
2013/0084926 A1 4/2013 Davis et al.
2013/0137506 A1* 5/2013 Low .................... G07F 17/3272 463/25
2014/0012652 A1 1/2014 Levin et al.
2015/0005059 A1 1/2015 Johnson
2017/0064033 A1* 3/2017 Stackel .................. G06Q 50/01
(Continued)

*Primary Examiner* — Jason T Yen
(74) *Attorney, Agent, or Firm* — Neal, Gerber & Eisenberg LLP

(57) ABSTRACT

Leaderboard promotions in gaming systems which provide one or more players one or more benefits in association with maintaining one or more designated positions on a leader-board for a designated duration.

20 Claims, 8 Drawing Sheets

(56) References Cited

U.S. PATENT DOCUMENTS

| | | | | |
|---|---|---|---|---|
| 2017/0213417 | A1* | 7/2017 | DiCarlo | G07F 17/3213 |
| 2018/0018855 | A1* | 1/2018 | Riggs | G07F 17/323 |
| 2018/0068529 | A1* | 3/2018 | Delekta | G07F 17/3209 |
| 2018/0089961 | A1 | 3/2018 | Filipour et al. | |

* cited by examiner

LEADERBOARD PROMOTIONS FOR GAMING SYSTEMS

This application is a continuation of, claims priority to and the benefit of U.S. patent application Ser. No. 17/991,646, filed on Nov. 21, 2022, which is a continuation of, claims priority to and the benefit of U.S. patent application Ser. No. 16/918,766, filed on Jul. 1, 2020, which is a continuation of, claims priority to and the benefit of U.S. patent application Ser. No. 16/056,035, filed on Aug. 6, 2018, the entire contents of which are each incorporated by reference herein.

BACKGROUND

Gaming machines may provide players awards in primary games. Gaming machines generally require the player to place or make a wager to activate the primary game. The award may be based on the player obtaining a winning symbol or symbol combination and on the amount of the wager.

BRIEF SUMMARY

In certain embodiments, the present disclosure relates to a gaming system comprising a processor, and a memory device which stores a plurality of instructions. When executed by the processor at a first point in time, the instructions cause the processor to cause a display device to display a leaderboard comprising, for each of a quantity of ranked positions, an identifier of one of a first plurality of players having a player ranking corresponding to that ranked position. When executed by the processor at a second, subsequent point in time, the instructions cause the processor to cause the display device to display the leaderboard comprising, for each of the quantity of ranked positions, an identifier of one of a second plurality of players having a player ranking corresponding to that ranked position. When executed by the processor responsive to a determination that one of the first plurality of players is one of the second plurality of players, the instructions cause the processor to determine a benefit associated with that player maintaining one of the ranked positions of the leaderboard from the first point in time to the second, subsequent point in time, and cause the display device to display the determined benefit.

In certain embodiments, the present disclosure relates to a gaming system comprising a processor, and a memory device which stores a plurality of instructions, which when executed by the processor, cause the processor to cause a display device to display a leaderboard comprising a plurality of ranked positions, and for each of the quantity of ranked positions, at each of a plurality intervals: determine a player having a ranking corresponding to that ranked position, and cause the display device to display an identifier of the determined player. When executed by the processor responsive to a leaderboard benefit determination event occurring based on one of the players maintaining one of the rankings corresponding to one of the ranked positions for a designated duration, the instructions cause the processor to determine a benefit, and cause the display device to display the determined benefit.

In certain embodiments, the present disclosure relates to gaming system comprising a processor, and a memory device which stores a plurality of instructions, which when executed by the processor, cause the processor to: cause a display device to display a leaderboard comprising a quantity of ranked positions, and for each of a plurality intervals, determine a player ranking for each of a plurality of players, determine, based on the determined player rankings, a quantity of the plurality of players corresponding to the quantity of ranked positions of the leaderboard, and cause the display device to display, for each of the ranked positions of the leaderboard, an identifier of one of the plurality of players of the determined quantity of the plurality of players. When executed by the processor responsive to a leaderboard benefit determination event occurring, the instructions cause the processor to determine whether any of the plurality of players of the quantity of the plurality of players corresponding to the quantity of ranked positions of the leaderboard qualify to obtain any benefits based on a duration of being one of the quantity of the plurality of players. When executed by the processor responsive to the determination being that a player of the quantity of the plurality of players corresponding to the quantity of ranked positions of the leaderboard qualifies, for each qualifying player, the instructions cause the processor to determine a benefit associated with maintaining one of the ranked positions of the leaderboard, and cause the display device to display the determined benefit.

Additional features are described herein, and will be apparent from the following Detailed Description and the figures.

DETAILED DESCRIPTION

In various embodiments, the gaming system disclosed herein provides one or more players one or more benefits in association with maintaining one or more designated positions on a leaderboard. In these embodiments, for each of a plurality of different players, the gaming system tracks one or more events that occur in association with that player during one or more gaming sessions. The gaming system further ranks the different players based on the tracked events and causes one or more display devices to display, via a leaderboard, a designated quantity of such ranked players. In these embodiments, since different players have different gaming experiences during different periods of time, the quantity of tracked events that occur in association with the different players vary over time and, thus, the assigned ranking to the different players vary over time. As such, to entice players to maintain one or more rankings associated with one or more designated positions of a leaderboard, upon one or more occurrences of a leaderboard benefit determination event, the gaming system determines one or more benefits for those players, if any, able to maintain a designated ranking over a designated period of time and/or quantity of games played. That is, in addition to utilizing a leaderboard to display to different players (and passersby) the relative ranking of various players, the present disclosure provides zero, one or more of such ranked players one or more rewards, such as monetary awards and/or non-monetary awards, for remaining on a leaderboard for a specified duration. Such a configuration not only encourages players to initially get onto a leaderboard (i.e., be ranked as one of the designated quantity of positions of the leaderboard), but further encourages players to remain on the leaderboard (i.e., maintain at least that acquired ranking over a specified duration) for as long as possible.

Figure 1:
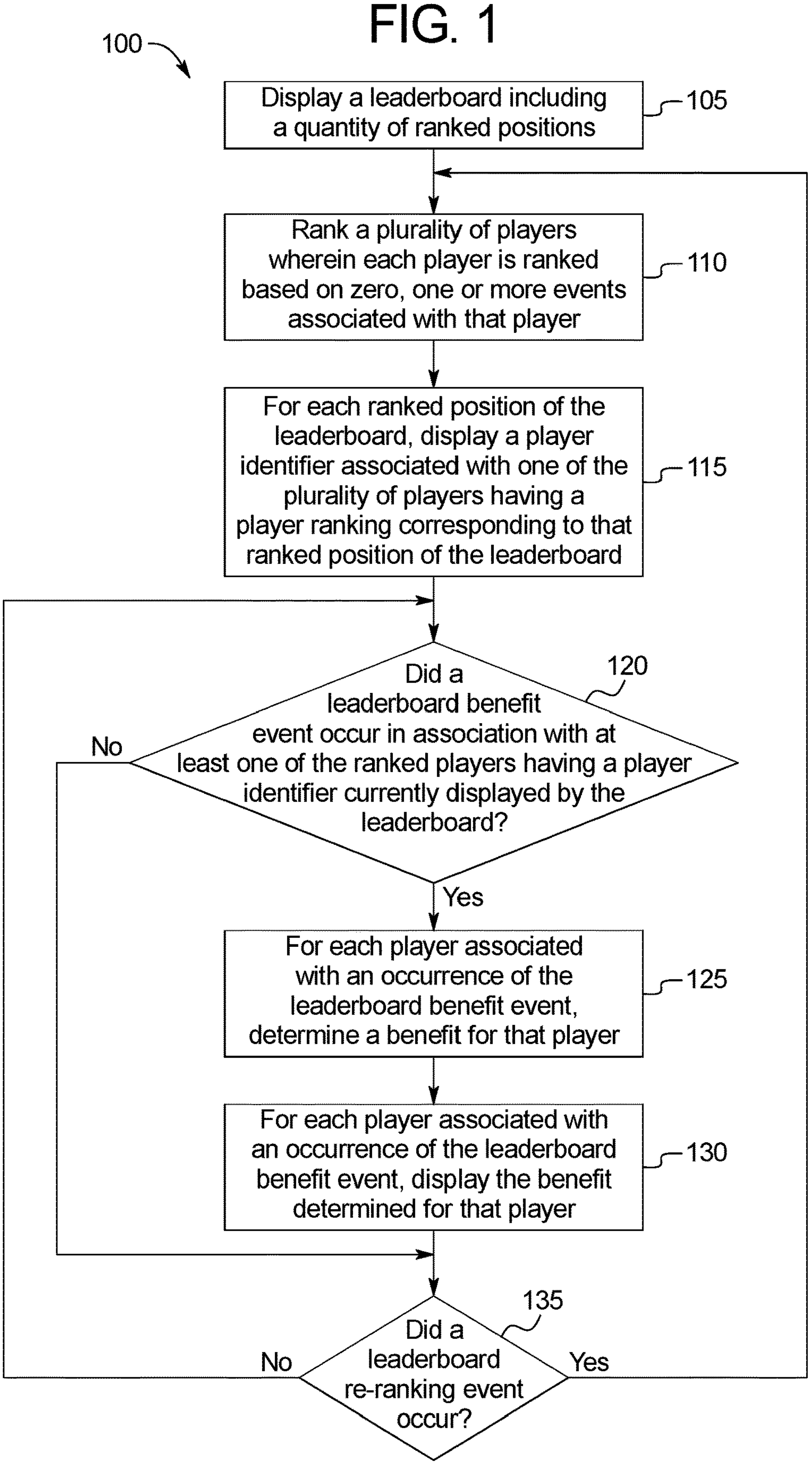
FIG. 1 is a flow chart of an example process for operating a gaming system that facilitates providing benefit(s) to player(s) in association with maintaining designated position(s) on a leaderboard.

FIG. 1 is a flowchart of an example process or method 100 of operating the gaming system of the present disclosure. In various embodiments, the process 100 is represented by a set of instructions stored in one or more memories and executed by one or more processors. Although the process 100 is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In operation of this example embodiment, as indicated by block 105, the gaming system displays a leaderboard including a quantity of ranked positions. The ranked positions correspond to a relative order that different players participating in a promotion, or sequence, are ranked according to one or more criteria at different points in time. That is, as the respective rankings for different players may change throughout each player's participation in the promotion, such as a tournament, the gaming system utilizes the leaderboard to dynamically convey the players that are currently ranked (i.e., at that point in time) at the ranked positions that qualify for display on the leaderboard.

In certain embodiments, the leaderboard corresponds to tracked events or actions associated with plays of a game. In different embodiments, the game may be any suitable game of chance, skill-based game, partial-skill-based game, or pseudo-skill-based game played as a primary game and/or a secondary (or bonus) game.

In association with displaying the leaderboard, the gaming system ranks a plurality of players wherein each player is ranked based on zero, one or more events associated with that player, as indicated by block 110. Events associated with the player correspond to player activity, player inactivity, wager activity, wager inactivity, play activity, and/or play inactivity of the game on each device included in the gaming system.

The gaming system acquires or determines at least one ranking component for each player or for each electronic gaming machine ("EGM") through monitoring of events. Acquired ranking components include at least one of the following: (1) a total amount wagered on each EGM, (2) a total amount wagered by each player, (3) a number of games played on each EGM, (4) a number of games played by each player, (5) an amount of each wager placed on each play of each EGM, (6) an amount of each wager placed on each play by each player, (7) an amount of time between each play of each game on the EGMs, (8) an amount of time between each play of each game by each player, (9) a quality of play of each player (i.e., a player's skill level or how closely each player plays to optimal play), (10) game points (or score) awarded on each play by each player, (11) cumulative (or total) points awarded to each player during a gaming session (e.g., a plurality of plays of the game), (12), an amount of money awarded to each player during free spin plays, (13) fastest time completing a skill challenge for each play by each player, and/or (14) a highest level achieved in a bonus play for each player. In various alternative embodiments, a player's ranking may be based on only one or only a designated quantity of the above-listed ranking components.

In the illustrated example embodiment, the gaming system determines a rank or ranking for at least one player based on at least one of the acquired ranking components. For example, one tracked or acquired ranking component includes cumulative points awarded to each player during a gaming session. The cumulative points awarded to each player can be a calculated amount based on the sum of the points awarded to each player for each play of the game during the gaming session. The gaming system tracks the points awarded for each play by each player during the gaming session in any suitable manner. Alternatively, each of the EGMs of the gaming system individually tracks the points awarded for each play by each player during the gaming session at the respective EGM. In this example embodiment, the respective EGMs send information to the gaming system upon request from the gaming system, at designated intervals, or in any other suitable manner.

In one embodiment, the gaming system tracks or acquires one or more ranking components dynamically. That is, the gaming system tracks or acquires one or more ranking components during a constantly or consistently moving time period. The moving time period is represented by a moving indicator that shifts or moves in accordance with a predetermined algorithm or any other suitable manner. Each ranking component is associated with at least one player and is acquired or tracked over the moving time period. The cumulative points awarded may include points awarded for each play by the player in one or more games. In certain embodiments, the gaming system utilizes the points awarded acquired from each player during the time window to determine a ranking for the player. It should be appreciated that the time window moves or shifts at designated intervals, such as every second, every ten seconds, every thirty seconds or at any other suitable number of time units. With each movement, different time units (and different ranking components) may be utilized by the gaming system to determine the player's ranking. The gaming system positions the ranked player along a ranking scale relative to other ranked players based on the determined player ranking.

It should be appreciated that a player may change EGMs during the acquisition of ranking component(s) and that the tracking and acquisition of ranking component(s) can be independent of the specific EGM. For example, in this embodiment, the gaming system monitors, tracks, and acquires events on each EGM by individual players through a player tracking system.

After ranking the plurality of players, for each ranked position of the leaderboard, the gaming system causes the leaderboard to display a player identifier associated with one of the plurality of players having a player ranking corresponding to that ranked position of the leaderboard, as indicated by block 115. The player identifier corresponds to an identifier used to identify a player, such as a name, a handle, an EGM identifier, an account number identifier, etc.

In certain embodiments, for each player that qualifies for display on the leaderboard, the gaming system displays additional player-related information, such as one or more of the acquired ranking components associated with the respective player (e.g., points awarded for a play by the player, cumulative points awarded for plays by the player during a gaming session, etc.). However, it should be appreciated that the gaming system may cause the leaderboard to display additional or alternative information, such as the amount of time that the player has been ranked and displayed on the leaderboard at their current ranking position, the amount of time that the player has been ranked and displayed on the leaderboard at any ranking position of the leaderboard, the quantity of games played by the player while ranked and displayed on the leaderboard at their current (or higher) ranking position, the quantity of games played by the player while ranked and displayed on the leaderboard at any ranking position of the leaderboard, the quantity of games that the respective player has played while they have been ranked and displayed on the leaderboard at their current (or higher) ranking position and/or the quantity of games that the respective player has played while they have been ranked and displayed on the leaderboard at any ranking position of the leaderboard.

Figure 2A:
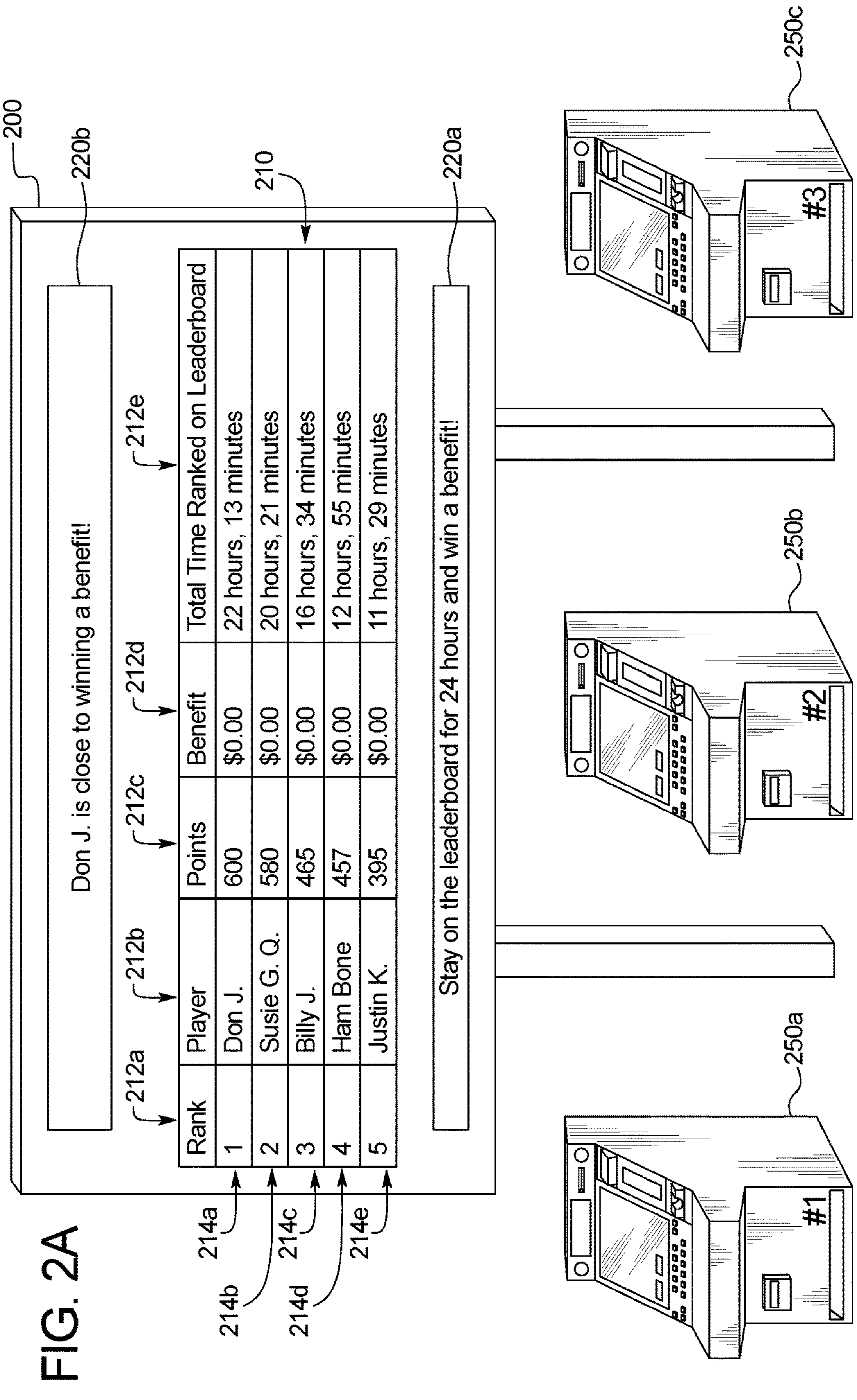
FIGS. 2A, 2B, and 2C are perspective views of one embodiment of the gaming system disclosed herein illustrating a leaderboard and a plurality of gaming machines at different points in time.

FIG. 2A illustrates a gaming environment including a central display 200 and a plurality of EGMs 250. In this example embodiment, the gaming system includes EGMs 250, which enable a plurality of players to simultaneously play the same games.

In this example embodiment, the central display 200 includes a leaderboard 210, including a plurality of player information identifiers 212 and a plurality of designated ranking positions 214. In this example embodiment of FIG. 2A, the information displayed on the leaderboard 210 corresponds to a first point in time.

The plurality of player information identifiers 212 identify information associated with the respective players who qualify for display on the leaderboard 210. A first player information identifier 212*a* of the leaderboard 210 identifies a designated ranking position on the leaderboard 210. A second player information identifier 212*b* of the leaderboard 210 identifies a player identifier associated with each player of the corresponding ranking position of the leaderboard 210. A third player information identifier 212*c* of the leaderboard 210 identifies points awarded to each player of the corresponding ranking position. In this example embodiment, the points awarded correspond to cumulative (total) points awarded to the corresponding player over a plurality of plays. A fourth player information identifier 212*d* identifies a benefit (if any) provided to each player of the corresponding ranking position. In this example embodiment of FIG. 2A, any benefit provided (or awarded) to a player is a monetary value (e.g., dollars or other currency). In this example embodiment, any benefits displayed on the leaderboard 210 correspond to cumulative benefits provided to the corresponding player. A fifth player information identifier 212*e* indicates a total time that each player of the corresponding ranking position has been ranked and displayed on the leaderboard 210. In this example embodiment, the total time corresponds to a cumulative time ranked and displayed at any designated ranking position on the leaderboard 210. However, in other embodiments, the total time corresponds to a time ranked and displayed at respective designated ranking positions on the leaderboard 210.

In this example embodiment of FIG. 2A, the designated ranking positions 214 correspond to five ranked positions and display information (i.e., player information 212) associated with the players corresponding to the respective designated ranking positions 214. It should be appreciated that other embodiments may include a leaderboard including any suitable quantity of ranked positions.

In this example embodiment, a first row of the leaderboard 210 corresponds to a first ranking position 214*a* and indicates that a player "Don J." is currently ranked in first place (i.e., at the first point in time), has accumulated 600 points, and has been ranked and displayed on the leaderboard 210 for a total time of 22 hours and 13 minutes (i.e., has been ranked in at least one of the five ranking positions 214 of the leaderboard 210 for the respective time duration). The first row corresponding to the first ranking position 214*a* also indicates that the player "Don J." has not been provided any benefits (e.g., a benefit of "$0.00") at the first point in time. In this example embodiment, the benefit provided to the player is a monetary value.

It should be appreciated that the benefit may be a monetary benefit and/or a non-monetary benefit. In different embodiments, one or more benefits disclosed herein include one or more of: a quantity of monetary credits, a quantity of non-monetary credits, a quantity of promotional credits, a quantity of player tracking points, an amount of virtual currency, an amount of cryptocurrency (e.g., 1 Satoshi), a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), a coupon for a reduced good, a coupon for a reduced service, a coupon for a complimentary good, a coupon for a complimentary service, virtual goods associated with the gaming system, virtual goods not associated with the gaming system, and/or an access code usable to unlock content on an internet.

In certain embodiments, the benefit includes a play of a secondary game, such as a free spins game. In different embodiments, the benefit includes a play (e.g., a free play) of any suitable game, including, but not limited to: a play of any suitable slot game; a play of any suitable nudging wild symbol game, a play of any suitable expanding wild symbol game, a play of any suitable wheel game, a play of any suitable card game, a play of any suitable multi-hand card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, a play of any suitable group game, a play of any suitable game in a service window, a play of any suitable game on a mobile device, and/or a play of any suitable game disclosed herein.

In various embodiments, the benefit additionally or alternatively includes an activation of one or more features which, if activated, modifies one or more components, aspects, or elements of a play of a game, such as modifies a game outcome (e.g., the symbols evaluated for the play of the game), modifies the paytable utilized for the play of the game and/or modifies any award determined for the play of the game. In different embodiments, such features include, but are not limited to: a modifier, such as a multiplier, feature; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying a paytable utilized for a play of a game; a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects of one or more games (e.g., colors, speeds, sound) are displayed to a player; and/or a feature modifying any game play feature associated with any play of any game disclosed herein.

In various embodiments, the benefit additionally or alternatively includes any suitable feature that represents, if activated, an additional award independent of the play of the game and/or an opportunity to win an additional award independent of the play of the game. In different embodiments, such features include, but are not limited to: a feature that triggers a secondary or bonus game; a feature that provides an additional award amount to a player; a feature modifying an amount of credits of a credit balance; a feature modifying an amount of promotional credits; a feature modifying a rate of earning player tracking points; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; and/or a feature modifying a generated outcome (or a designated generated outcome) in a secondary game.

In this example embodiment, a second row of the leaderboard 210 corresponds to a second ranking position 214*b* and indicates that a player "Susie G. Q." is currently ranked in second place (i.e., at the first point in time), has accumulated 580 points, and has been ranked and displayed on the leaderboard 210 for a total time of 20 hours and 21 minutes (i.e., has been ranked in at least one of the five ranking positions 214 of the leaderboard 210 for the respective time duration). The second row corresponding to the second ranking position 214*b* also indicates that the player "Susie G. Q." has not received any benefits (e.g., a benefit of "$0.00") at the first point in time.

In this example embodiment, a third row of the leaderboard 210 corresponds to a third ranking position 214*c* and indicates that a player "Billy J." is currently ranked in third place (i.e., at the first point in time), has accumulated 465 points, and has been ranked and displayed on the leaderboard 210 for a total time of 16 hours and 34 minutes (i.e., has been ranked in at least one of the five ranking positions 214 of the leaderboard 210 for the respective time duration). The third row corresponding to the third ranking position 214*c* also indicates that the player "Billy J." has not received any benefits (e.g., a benefit of "$0.00") at the first point in time.

In this example embodiment, a fourth row of the leaderboard 210 corresponds to a fourth ranking position 214*c* and indicates that a player "Ham Bone" is ranked currently in fourth place (i.e., at the first point in time), has accumulated 457 points and has been ranked and displayed on the leaderboard 210 for a total time of 12 hours and 55 minutes (i.e., has been ranked in at least one of the five ranking positions 214 of the leaderboard 210 for the respective time duration). The fourth row corresponding to the fourth ranking position 214*d* also indicates that the player "Ham Bone" has not received any benefits (e.g., a benefit of "$0.00") at the first point in time.

In this example embodiment, a fifth row of the leaderboard 210 corresponds to a fifth ranking position 214*e* and indicates that a player "Justin K." is currently ranked in fifth place (i.e., at the first point in time), has accumulated 395 points, and has been ranked and displayed on the leaderboard 210 for a total time of 11 hours and 29 minutes (i.e., has been ranked in at least one of the five ranking positions 214 of the leaderboard 210 for the respective time duration). The fifth row corresponding to the fifth ranking position 214*e* also indicates that the player "Justin K." has not received any benefits (e.g., a benefit of "$0.00") at the first point in time.

In this example embodiment of FIG. 2A, the central display 200 also includes a plurality of message display areas 220 that display messages to players (and passersby). For example, in this example embodiment, a first message display area 220*a* displays a message "Stay on the leaderboard for 24 hours and win a benefit!" That is, in this example embodiment, the first message display area 220*a* indicates how a player becomes eligible to win a benefit (i.e., to be eligible to win a benefit, the player should remain on the leaderboard (i.e., remain ranked in the (top) five designated ranking positions) for a designated period of 24 hours). However, it should be appreciated that in other embodiments, the gaming system may additionally or alternatively use other designated periods. For example, the designated period is a different amount of time (e.g., 12 hours) and/or a quantity of games played (e.g., 100 games played).

In this example embodiment of FIG. 2A, the central display 200 includes a second message display area 220*b* to display a message "Don J. is close to winning a benefit!" That is, the second message display area 220*b* indicates that the player "Don J." is relatively close to winning a benefit (i.e., has remained on the leaderboard for close to 24 hours). In this example embodiment, the second message display area 220*b* displays a dynamic message. For example, the gaming system causes the second message display area 220*b* to display a message indicating whether any players have been provided a benefit and/or whether any players are relatively close to being provided a benefit. In this example embodiment of FIG. 2A, the gaming system determines a player is relatively close to being provided a benefit when their respective total time ranked on leaderboard information is within 2 hours of the designated period (e.g., the player has been ranked on the leaderboard 210 for at least 22 hours). It should be appreciated that other metrics for determining whether a player is relatively close to being provided a benefit may additionally or alternatively be used. For example, the gaming system determines a player is relatively close to being provided a benefit when their total time ranked on the leaderboard 210 is within a percentage (e.g., 10 percent) of the designated period.

In the illustrated embodiment of FIG. 2A, the central display 200 and the leaderboard 210 is positioned adjacent to the EGMs 250. However, it should be appreciated that in additional or alternate embodiments, the EGMs 250 may not be positioned adjacent to each other and/or the central display 200 and/or the leaderboard 210 may be positioned away from at least one of the EGMs 250.

In another embodiment, the central display 200 displays other information in addition to the leaderboard 210. For example, the central display 200 may be part of a messaging system of the gaming environment and display (e.g., periodically, aperiodically, and/or as a one-time event) the leaderboard 210 for a (short) period of time.

Returning to the example process 100 of FIG. 1, after displaying the leaderboard with the player identifiers (as indicated by block 115), the gaming system determines whether a leaderboard benefit event occurred in association with at least one of the ranked players having a player identifier currently displayed by the leaderboard, as indicated by diamond 120. In some embodiments, the leaderboard benefit event corresponds to a specified duration (e.g., a designated period of time, such as every hour or every 24 hour period, and/or a designated quantity of games played, such as every 100 games played by the player) the player remains on the leaderboard. In certain embodiments, the gaming system performs a check to determine whether a leaderboard benefit event occurred at fixed times (e.g., at midnight, every sixty minutes, etc.). In certain embodiments, the gaming system performs a check (e.g., periodically, aperiodically, or as a one-time event) to determine whether a leaderboard benefit event occurred. For example, after displaying the leaderboard (or an updated leaderboard) with the player identifiers for the players who qualify for display on the leaderboard, the gaming system performs a check to determine if any of the players ranked on the leaderboard satisfy a period of time threshold (e.g., have been ranked and displayed on the leaderboard for at least 24 hours, etc.) and/or a quantity of gamed played threshold (e.g., have been ranked and displayed on the leaderboard for at least 300 games played, etc.).

In some embodiments, a leaderboard benefit event corresponds to a system-wide event. Example system-wide leaderboard benefit events include an expiration of a timer or a quantity of games played by a plurality of players. In some embodiments, a leaderboard benefit event corresponds to a player event. Example player leaderboard benefit events include a quantity of games played by a player or a total time ranked on the leaderboard by a player. However, it should be appreciated that the system-wide leaderboard benefit events and/or player leaderboard benefit events may correspond to any suitable leaderboard benefit event.

In some embodiments, a leaderboard benefit event corresponds to a certain number of games played, such as every game played or every tenth game played, by other players attempting to beat a cumulative points awarded associated with a player ranked and displayed on the leaderboard. For example, the gaming system determines that a leaderboard benefit event occurs for a first player for each play by a second player and the first player remains ranked and displayed on the leaderboard (e.g., the cumulative points awarded to the second player after the play is not relatively better than the cumulative points awarded to the first player).

In some embodiments, the leaderboard benefit event corresponds to a quantity of attempts in a bonus game. In some embodiments, the gaming system determines that a leaderboard benefit event occurs each time a player satisfies a skill bonus.

As described above, in some embodiments, the leaderboard benefit event corresponds to a period associated with a tournament. In some such embodiments, the gaming system determines that a leaderboard benefit event occurs for a player when the player remains on the leaderboard for a designated quantity of tournament sessions.

In some embodiments, the leaderboard benefit event corresponds to having any ranking position on the leaderboard. In some such embodiments, the gaming system determines that a leaderboard benefit event occurs for a player after updating the leaderboard to include the player identifiers. For example, for a player who enters the leaderboard in the second ranking position, the gaming system determines that the leaderboard benefit occurs for the respective player each time the leaderboard is updated (e.g., based on an occurrence of a leaderboard re-ranking event, as described below in connection with diamond 135) and the respective player remains on the leaderboard.

In some embodiments, the leaderboard benefit event corresponds to a player having an initial player ranking position on the leaderboard and maintaining and/or improving their player ranking position on the leaderboard. In some such embodiments, the gaming system determines that a leaderboard benefit event occurs for a player included on the leaderboard after updating the leaderboard to include the player identifiers and determining that the player ranking position of the player after updating the leaderboard is the same or better than their player ranking position before updating the leaderboard. For example, for a player who enters the leaderboard in the third ranking position, the gaming system determines that the leaderboard benefit occurs for the respective player each time the leaderboard is updated (e.g., based on an occurrence of a leaderboard re-ranking event, as described below in connection with diamond 135) and the respective player remains on the leaderboard in the third ranking position. In some embodiments, for a player who enters the leaderboard in the third ranking position, the gaming system determines that the leaderboard benefit occurs for the respective player each time the leaderboard is updated (e.g., based on an occurrence of a leaderboard re-ranking event, as described below in connection with diamond 135) and the respective player remains on the leaderboard in the third ranking position or is moved to the first ranking position or to the second ranking position.

In some embodiments, the leaderboard benefit event corresponds to having a ranking position on the leaderboard and completing a qualifying task while maintaining the ranking position on the leaderboard. Example qualifying tasks include playing at least one game associated with the leaderboard during a designated period (e.g., every 24 hours, once a week, etc. while having the ranking position on the leaderboard), playing the game associated with the leaderboard for a designated period of time (e.g., playing the game at least 10 minutes while having the ranking position on the leaderboard, etc.), placing a designated wager at least once for a play of a game associated with the leaderboard (e.g., placing a wager of at least $10 for the play while having the ranking position on the leaderboard, etc.), and/or placing a cumulative designated wager for one or more plays of a game associated with the leaderboard (e.g., placing any wagers for one or more plays of the game that totals at least $50 while having a ranking position on the leaderboard, etc.).

If, as indicated by diamond 120, the gaming system determines that a leaderboard benefit event occurred in association with at least one of the ranked players having a player identifier currently displayed by the leaderboard, for each player associated with an occurrence of the leaderboard benefit event, the gaming system determines a benefit for that player, as indicated by block 125.

In some embodiments, the gaming system scales the benefits determined for a player based on their ranking position on the leaderboard. For example, the gaming system determines a first benefit of ten player points for each play of a game by a player ranked in the first ranking position, determines a second benefit of nine player points for each play of a game by a player ranked in the second ranking position, etc.

In some embodiments, the gaming system scales benefits determined for a player for the player being ranked simultaneously on a plurality of leaderboards. For example, a gaming environment may include a first leaderboard associated with plays of a poker game and a second leaderboard associated with plays of a slots game. In some such examples, the gaming system determines a first benefit for a first player who is ranked and displayed on the first leaderboard, determine a second benefit for a second player who is ranked and displayed on the second leaderboard, and determine a third benefit that is greater in value than the first benefit and the second benefit for a third player who is ranked and displayed on the first leaderboard and ranked and displayed on the second leaderboard.

In some embodiments, a player is eligible for a secondary benefit based on their presence (i.e., being ranked and displayed) on the leaderboard. For example, the gaming system selects (e.g., periodically, aperiodically, and/or as a one-time event) a player who is ranked and displayed on the leaderboard and awards the player a secondary benefit, such as a mystery jackpot or a mystery bonus award (e.g., an award of $25). In some embodiments, the gaming system randomly selects the player to award the secondary benefit. In some such embodiments, each player who is ranked and displayed on the leaderboard is associated with the same probability of being selected. For example, if a leaderboard includes five ranked positions, the gaming system assigns each player who is associated with a ranked position on the leaderboard a twenty percent chance of being selected.

In some embodiments, the gaming system assigns weights to the players based on their respective ranked position on the leaderboard. For example, if a leaderboard includes five ranked positions, the gaming system assigns a first player associated with the first ranked position on the leaderboard a thirty percent chance of being randomly selected, assigns a second player associated with the second ranked position on the leaderboard a twenty-five percent chance of being randomly selected, assigns a third player associated with the third ranked position on the leaderboard a twenty percent chance of being randomly selected, assigns a fourth player associated with the fourth ranked position on the leaderboard a fifteen percent chance of being randomly selected, and assigns a fifth player associated with the fifth ranked position on the leaderboard a ten percent chance of being randomly selected.

In some embodiments, the gaming system randomly selects two or more players to award the secondary benefit.

In the example embodiment of process 100 of FIG. 1, after the gaming system determines the benefit for the respective players, for each player associated with an occurrence of the leaderboard benefit event, the gaming system displays the benefit determined for that player, as indicated by block 130. The gaming system may cause the leaderboard to display the determined benefit for the one or more players since the occurrence of the previous leaderboard benefit event and/or to display cumulative benefits determined for the one or more players since the respective players have been ranked and displayed on the leaderboard.

In some embodiments, the gaming system provides (or makes available) the determined benefit to the respective player after displaying the determined benefit. For example, the gaming system determines to award a player ten player points and then provides the player the ten player points after displaying, via the leaderboard, that the player received the ten player points.

In some embodiments, the gaming system provides the determined benefit to a player after a leaderboard benefit expiration event. For example, while the player remains ranked and displayed on the leaderboard, the gaming system determines and displays any benefits to award the player. Once the gaming system determines to remove the player from the leaderboard (e.g., their ranked position no longer qualifies for display on the leaderboard), the gaming system provides the player any determined benefits. That is, in this example embodiment, the gaming system displays, via the leaderboard, that a player has been awarded a benefit of 12,000 player points for remaining on the leaderboard for 12 hours, but the gaming system does not make the 12,000 player points available to the player until the player is removed from the leaderboard (i.e., no longer ranked and displayed on the leaderboard).

In some embodiments, the gaming system periodically provides the determined benefit to the player. For example, the gaming system determines and displays any benefits to award players at the occurrence of respective leaderboard benefit events, but the gaming system does not provide (or make available) any determined benefits to the player(s) until midnight.

In some embodiments, when the gaming system provides one or more players a benefit based on one or more occurrences of a leaderboard benefit event, the gaming system modifies the leaderboard and/or the player rankings. For example, after the gaming system provides one or more players respective benefits for remaining on the leaderboard for a specified duration, the gaming system resets the leaderboard to not display any player identifiers. In some embodiments, the gaming system removes those players that were provided any benefits from the leaderboard.

Figure 2B:
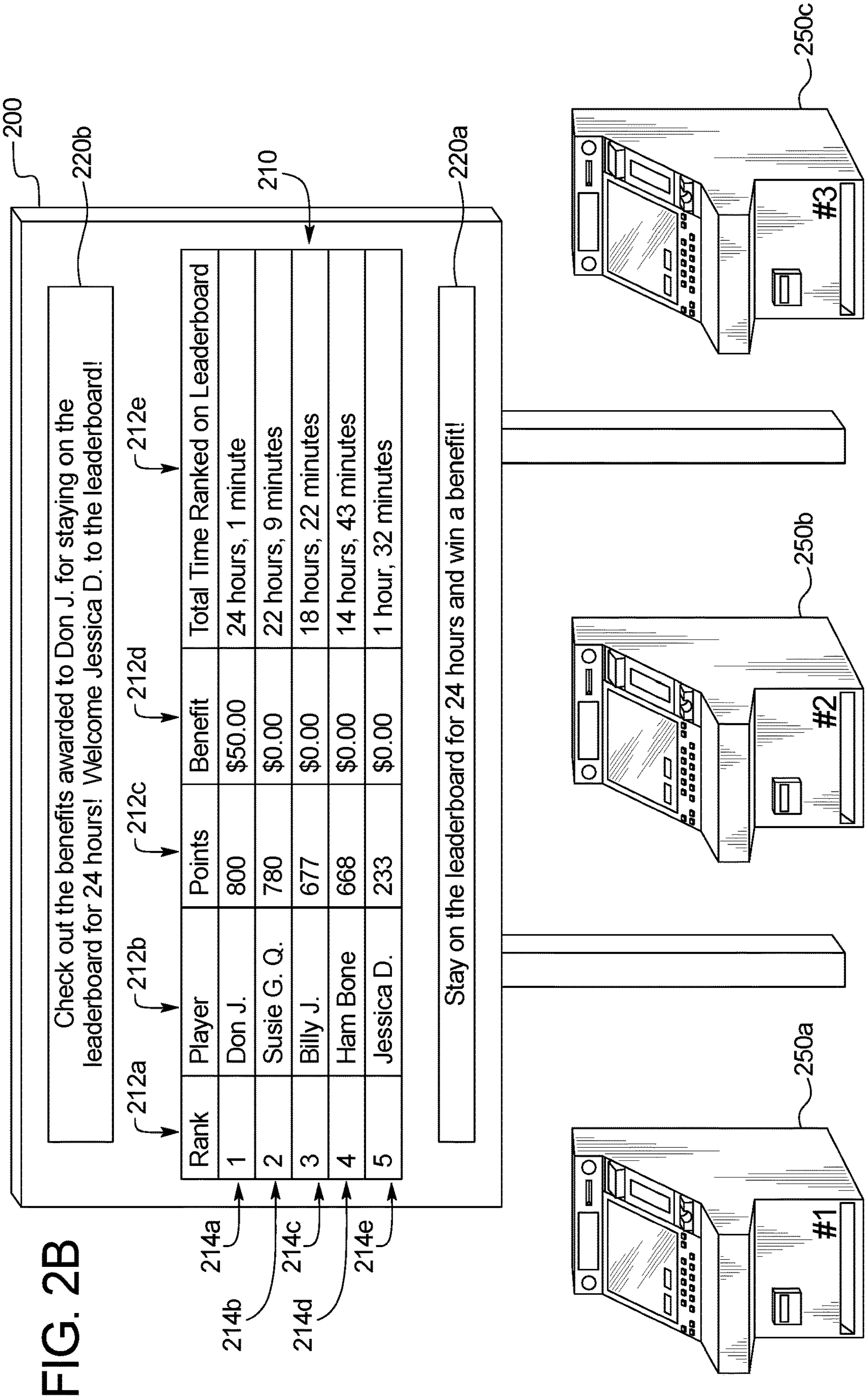

FIG. 2B illustrates the gaming environment of FIG. 2A at a second point in time that occurs after the first point in time of FIG. 2A. In this example embodiment of FIG. 2B, the gaming system has removed the player "Justin K." from being ranked and displayed on the leaderboard 210 and has added a player "Jessica D." to the fifth row corresponding to the fifth ranking position 214*e* of the leaderboard 210.

The player "Jessica D." has accumulated 233 points, and has been ranked and displayed on the leaderboard 210 for a total time of 1 hour and 32 minutes (i.e., has been ranked in at least one of the five ranking positions 214 of the leaderboard 210 for the respective time duration). The fifth row corresponding to the fifth ranking position 214*e* also indicates that the player "Jessica D." has not received any benefits (e.g., a benefit of "$0.00") at the second point in time.

In this example embodiment of FIG. 2B, the second point in time corresponds to at least one leaderboard benefit event occurring in association with at least one of the ranked players having a player identifier currently displayed by the leaderboard. For example, the gaming system determines whether any of the currently ranked and displayed on the leaderboard 210 have been ranked and displayed for a 24 hour duration. That is, referring to the first row of the leaderboard 210 that corresponds to the first ranking position 214*a*, the player "Don J." is currently ranked in first place (i.e., at the second point in time), has accumulated 800 points, and has been ranked and displayed on the leaderboard 210 for a total time of 24 hours and 1 minute (i.e., has been ranked in at least one of the five ranking positions 214 of the leaderboard 210 for the respective time duration). The first row corresponding to the first ranking position 214*a* also indicates that the player "Don J." has been provided a benefit (i.e., a benefit of "$50.00") at the second point in time. In this example embodiment, the benefit provided to the player is a monetary value.

In this example embodiment of FIG. 2B, the gaming system determines that a leaderboard benefit event did not occur for the player "Susie G. Q.," the player "Billy J.," the player "Ham Bone," and the player "Jessica D." Accordingly, no benefit is provided to the respective players and no benefit (i.e., a benefit of "$0.00") is displayed for the respective players on the leaderboard 210 at the second point in time.

In this example embodiment of FIG. 2B, the gaming system updates the information displayed via the leaderboard 210 based on any tracked events associated with the players. For example, the gaming system updates the points won by the respective players and the total time ranked on the leaderboard.

In this example embodiment, the gaming system updates the message displayed in the second message display area 220*b* based on whether the gaming system provided a benefit to at least one player and/or based on the total time ranked on leaderboard information 212*e* displayed on the leaderboard 210. In this example embodiment of FIG. 2B, the central display 200 includes the second message display area 220*b* to display a message "Check out the benefits awarded to Don J. for staying on the leaderboard for 24 hours! Welcome Jessica D. to the leaderboard!" That is, the second message display area 220*b* indicates that a leaderboard benefit event occurred for the player "Don J." and has been awarded a benefit (i.e., a benefit of "$50.00"). The second message display area 220*b* also indicates that a new player (i.e., the player "Jessica D.") is new to being ranked and displayed on the leaderboard 210.

Returning to the example process 100 of FIG. 1, if the gaming system determines that no leaderboard benefit event occurred in association with any of the ranked players having a player identifier currently displayed by the leaderboard, as indicated by diamond 120, or after the gaming system displays the benefit determined for the respective players, as indicated by block 130, the gaming system proceeds to determine whether a leaderboard re-ranking event occurred, as indicated by block 135. That is, the gaming system may periodically re-rank (or update) the leaderboard to modify the player ranking positions on the leaderboard and/or update the player identifiers displayed via the leaderboard.

In some embodiments, a leaderboard re-ranking event corresponds to an expiration of an amount of time. For example, the gaming system triggers the leaderboard re-ranking event every 60 minutes since the previous leaderboard re-ranking event. It should be appreciated that the amount of time may be any suitable amount of time. In some embodiments, a leaderboard re-ranking event corresponds to a selected outcome associated with a play of the game by a player. For example, the gaming system triggers the leaderboard re-ranking event after a player playing a game obtains a particular score during their play of the game. In some embodiments, a leaderboard re-ranking event corresponds to activity associated with the leaderboard. For example, the gaming system triggers the leaderboard re-ranking event after the gaming system provides one or more players a benefit. In some embodiments, a leaderboard re-ranking event includes, but is not limited to, one or more of: (i) a designated time period; (ii) an amount wagered by one or more players on the gaming system; (iii) a quantity of EGMs simultaneously being played; (iv) one or more player's scores or game outcomes; or (v) a combination of any number of suitable events.

In this example embodiment of process 100, responsive to the gaming system determining that a leaderboard re-ranking event did not occur, as indicated by diamond 135, the gaming system proceeds to determine whether a leaderboard benefit event occurred in association with at least one of the ranked players having a player identifier currently displayed by the leaderboard, as indicated by diamond 120.

In this example embodiment of process 100, responsive to the gaming system determining that a leaderboard re-ranking event occurred, as indicated by diamond 135, the gaming system proceeds to rank a plurality of players wherein each player is ranked based on zero, one or more events associated with that player, as indicated by block 110. That is, the gaming system acquires (or re-acquires) ranking components for plays of the game and ranks the players.

Figure 2C:
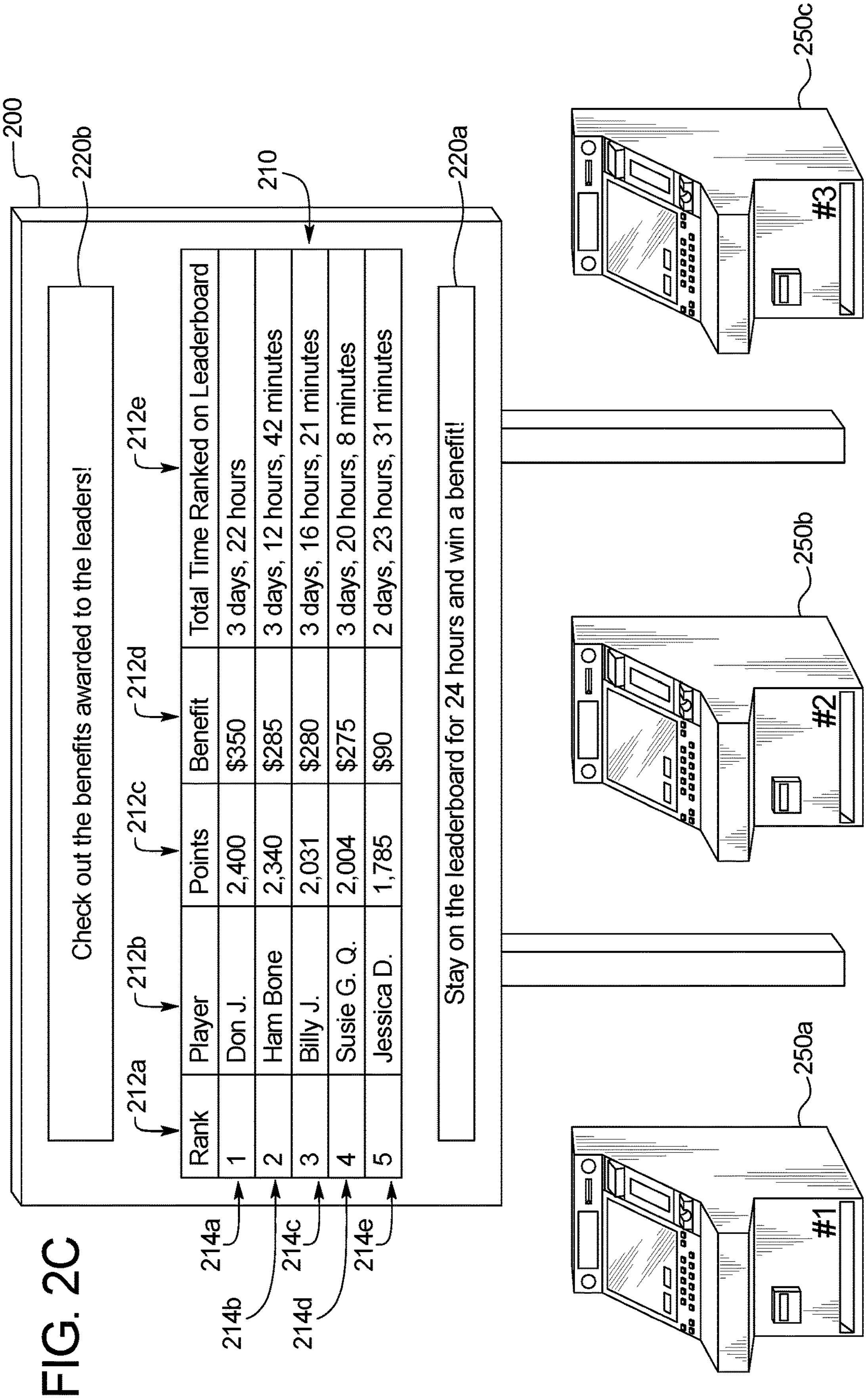

FIG. 2C illustrates the gaming environment at a third point in time that occurs after the second point in time of FIG. 2B. In this example embodiment of FIG. 2C, the relative ranking positions on the leaderboard 210 of the player "Don J.," the player "Billy J.," and the player "Jessica D." remains the same as displayed during the second point in time of FIG. 2B. However, the leaderboard 210 indicates that the player "Ham Bone" is now in the second ranking position 214*b* and the player "Susie G. Q." is now in the fourth ranking position 214*d* of the leaderboard. That is, described above, in some embodiments, a player qualifies for a benefit based on their total time ranked on the leaderboard (e.g., based on specified durations, such as 24 hours), but the players are ranked on the leaderboard based on their points. For example, referring to the leaderboard 210 of FIG. 2C, the leaderboard 210 shows that the player "Ham Bone" (i.e., the player associated with the second player ranking position 214*b*) has a total time ranked on the leaderboard (i.e., "3 days, 12, hours, 42 minutes") that is less than the player "Billy J.," who is associated with the third player ranking position 214*c* (i.e., "3 days, 16 hours, 21 minutes"), and the player "Susie G. Q.," who is associated with the fourth player ranking position 214*d* (i.e., "3 days, 20 hours, 8 minutes"). However, in this example embodiment, because the player "Ham Bone" has a points value (i.e., "2,340" points) that is relatively greater than the points values associated with the player "Billy J." (i.e., "2,031" points), the player "Susie G. Q." (i.e., "2,004" points), and the player "Jessica D." (i.e., "1,785" points), but relatively less than the points value associated with the player "Don J." (i.e., "2,400" points), the gaming system ranks (or re-ranks) the player "Ham Bone" in the second ranking position. As shown in FIG. 2C, in associated with ranking the player "Ham Bone" in the second ranking position, the gaming system also displays the player "Ham Bone" in the second ranking position 214*b* on the leaderboard 210.

In this example embodiment, the gaming system determines the benefits for a player based on the player ranking position of the player when a leaderboard benefit event occurs in association with a respective player and the quantity of leaderboard benefit events that have occurred for the respective player. For example, the gaming system may utilize Table 1 (below) when determining the benefits for a player.

TABLE 1

| Player Ranking Position at Occurrence of Leaderboard Benefit Event | First Occurrence of Leaderboard Benefit Event (i.e., 24 hours ranked on leaderboard) | Second Occurrence of Leaderboard Benefit Event (i.e., 48 hours ranked on leaderboard) | Third Occurrence of Leaderboard Benefit Event (i.e., 72 hours ranked on leaderboard) |
|---|---|---|---|
| Ranking Position: 1 | $50.00 | $100.00 | $200.00 |
| Ranking Position: 2 | $45.00 | $90.00 | $180.00 |
| Ranking Position: 3 | $40.00 | $80.00 | $160.00 |
| Ranking Position: 4 | $35.00 | $70.00 | $140.00 |
| Ranking Position: 5 | $30.00 | $90.00 | $120.00 |

It should be appreciated that other embodiments may use additional or alternate values of benefits awarded to the players and for any quantity of occurrences of the leaderboard benefit events.

Applying Table 1 to the players ranked and displayed on the leaderboard 210 at the third point in time of FIG. 2C, the first row corresponding to the first ranking position 214*a* of the leaderboard 210 indicates that the player "Don J." has been awarded a cumulative benefit of $350.00 at the third time of point (i.e., $50.00 for the first occurrence of the leaderboard benefit event while in the first ranking position+$100.00 for the second occurrence of the leaderboard benefit event while in the first ranking position+$200.00 for the third occurrence of the leaderboard benefit event while in the first ranking position=$350.00).

In this example embodiment of FIG. 2C, the second row corresponding to the second ranking position 214*b* of the leaderboard 210 indicates that the player "Ham Bone" has been awarded a cumulative benefit of $285.00 at the third time of point (i.e., $35.00 for the first occurrence of the leaderboard benefit event while in the fourth ranking position+$70.00 for the second occurrence of the leaderboard benefit event while in the fourth ranking position+$180.00 for the third occurrence of the leaderboard benefit event while in the second ranking position=$285.00).

In this example embodiment of FIG. 2C, the third row corresponding to the third ranking position 214*c* of the leaderboard 210 indicates that the player "Billy J." has been awarded a cumulative benefit of $280.00 at the third time of point (i.e., $40.00 for the first occurrence of the leaderboard benefit event while in the third ranking position+$80.00 for the second occurrence of the leaderboard benefit event while in the third ranking position+$160.00 for the third occurrence of the leaderboard benefit event while in the third ranking position=$280.00).

In this example embodiment of FIG. 2C, the fourth row corresponding to the fourth ranking position 214*d* of the leaderboard 210 indicates that the player "Susie G. Q." has been awarded a cumulative benefit of $275.00 at the third time of point (i.e., $45.00 for the first occurrence of the leaderboard benefit event while in the second ranking position+$90.00 for the second occurrence of the leaderboard benefit event while in the second ranking position+$140.00 for the third occurrence of the leaderboard benefit event while in the fourth ranking position=$275.00).

In this example embodiment of FIG. 2C, the fifth row corresponding to the fifth ranking position 214*e* of the leaderboard 210 indicates that the player "Jessica D." has been awarded a cumulative benefit of $90.00 at the third time of point (i.e., $30.00 for the first occurrence of the leaderboard benefit event while in the fifth ranking position+$60.00 for the second occurrence of the leaderboard benefit event while in the fifth ranking position=$90.00).

In this example embodiment of FIG. 2C, the gaming system updates the information displayed via the leaderboard 210 based on any tracked events associated with the players. For example, the gaming system updates the points won by the respective players and the total time ranked on the leaderboard.

In this example embodiment, the gaming system updates the message displayed in the second message display area 220*b* based on whether the gaming system provided a benefit to at least one player and/or based on the total time ranked on leaderboard information 212*e* displayed on the leaderboard 210. In this example embodiment of FIG. 2C, the central display 200 includes the second message display area 220*b* to display a message "Check out the benefits awarded to the leaders!" That is, the second message display area 220*b* indicates that a leaderboard benefit event occurred for a plurality of players.

In some embodiments, the gaming system communicates (or transmits) a notification to one or more players and/or one or more devices of one or more players. For example, the gaming system communicates a notification to a player and/or a device of a player when the gaming system determines a change in the player ranking positions displayed on the leaderboard. In some embodiments, the gaming system communicates a notification to a player and/or a device of a player whose player ranking position on the leaderboard has moved to a lower player ranking position. By communicating a notification to the player and/or a device of the player, the gaming system may motivate the player to resume playing the game associated with the leaderboard, return to the gaming environment in an attempt to remain on the leaderboard, etc.

In some embodiments, the gaming system communicates (or transmits) a notification to any players and/or any devices of any players who are negatively impacted by the change in player ranking positions on the leaderboard (e.g., any player whose player ranking position moved to a relatively lower player ranking position on the leaderboard or who was removed from the leaderboard) and/or to any players and/or any devices of any players who are positively impacted by the change in player ranking positions on the leaderboard (e.g., any player whose player ranking position moved to a relatively higher player ranking position or who were added to the leaderboard). In some embodiments, the gaming system communicates a notification to all players and/or any devices of the players included on the leaderboard in response to a change in the player ranking positions on the leaderboard. In some embodiments, the gaming system communicates a notification to any player and/or any devices of any players who played the game(s) associated with the leaderboard.

In some embodiments, the gaming system communicates (or transmits) a notification to a subset of players and/or devices of the subset of players who played the game(s) associated with the leaderboard. For example, if the leaderboard includes five ranking positions, the gaming system communicates a notification to the five players and/or devices of the five players included on the leaderboard and to the players and/or devices of the players associated with the next five ranking positions (i.e., communicate a notification to players and/or devices of the players whose ranking position is in the top ten of ranking positions). In some embodiments, the gaming system determines the subset of players to communicate the notifications to based on a comparison of the one or more ranking components associated with the players used to rank the players. For example, the gaming system includes any players in the subset of players whose corresponding ranking components satisfy a threshold difference from the ranking component associated with the player in the fifth ranking position. The threshold difference may be based on an absolute difference (e.g., 10 points, 100 points, 5 seconds, 2 hours, 5 played games, 10 played games, etc.) and/or a relative difference (e.g., whose points are within 5 percent of the points associated with the player in the fifth ranking position, etc.).

The gaming system communicates (or transmits) the notification to a player via an email, a text message, and/or a notification associated with a mobile device application. The notification may include information indicating to the player that the player is at risk of being awarded decreased benefits (e.g., in response to a decreased player ranking position associated with the player, etc.) or having benefits discontinued (e.g., in response to the player being removed from the leaderboard, etc.). In some embodiments, the gaming system communicates (or transmits) the notification to a player via a leaderboard, a central display, a community display, and/or an audio message.

In some embodiments, the notification may include information indicating to the player that the player is eligible to being awarded increased benefits (e.g., in response to an increased player ranking position associated with the player, etc.) or having benefits provided (e.g., in response to the player being added to the leaderboard, etc.).

In some embodiments, the gaming system enables people (e.g., patrons of the gaming environment, etc.) to place "back bets" associated with the leaderboard. The back bet may refer to a particular player (or players) (e.g., the player "Ham Bone," etc.) or to a general player (or players) (e.g., any player(s) included on the leaderboard, any player(s) not included on the leaderboard, etc.). As used herein, the terms "back bet," "back bets," "back-betting" or "back-better" refers to wager(s) placed with to respect to activity associated with the leaderboard. For example, a "back-better" may place a wager that a particular player identified on the leaderboard remains on the leaderboard for another hour and/or another ten games played. Additional or alternative examples of back bets that may be placed include placing a wager based on how long a player remains on the leaderboard before the gaming system removes the player, how long before the gaming system adds a player to the leaderboard, how long before the gaming system changes the ranking position of a player on the leaderboard, etc. As used herein, the length may refer to a specified duration (e.g., a particular player remains on the leaderboard for six hours before the gaming system removes the player from the leaderboard, etc.), a range of durations (e.g., a particular player remains on the leaderboard for four to six hours before the gaming system removes the player from the leaderboard, etc.), a specified quantity of games played (e.g., a particular player plays 350 games before the gaming system removes the player from the leaderboard, etc.), and/or a quantity range of games played (e.g., a particular player plays between 300 and 400 games before the gaming system removes the player from the leaderboard, etc.).

In some examples, the length associated with the back bet refers to a cumulative (or total) duration (e.g., a particular player remains on the leaderboard for a total time of nine to ten hours before the gaming system removes the player from the leaderboard, etc.). In some examples, the length associated with the back bet refers to a duration relative to when the back bet was placed (e.g., a particular player remains on the leaderboard for another two hours from when the back bet was placed before the gaming system removes the player from the leaderboard).

In some examples, the length associated with the back bet refers to a cumulative (or total) quantity of games played (e.g., a particular player remains on the leaderboard for a total of 300 to 400 games played before the gaming system removes the player from the leaderboard, etc.). In some examples, the length associated with the back bet refers to a quantity of games played relative to when the back bet was placed (e.g., a particular player remains on the leaderboard for another 200 games played from when the back bet was placed before the gaming system removes the player from the leaderboard).

In some embodiments, the gaming system displays information related to back bets placed with respect to the leaderboard. For example, the gaming system displays the quantity of back bets placed with respect to a particular player (or players) included on the leaderboard, the quantity of back-betters placing back bets with respect to a particular player (or players), the quantity of back bets placed with respect to any activity associated with the leaderboard, and/or the quantity of back-betters placing back bets with respect to any activity associated with the leaderboard.

In some embodiments, when determining any benefits to award a particular player, the gaming system applies a back-bets modifier to any benefits based on any back-bets information associated with the particular player (e.g., a quantity of back bets placed with respect to the particular player and/or a quantity of back-betters placing bets with respect to the particular player). The back-bets modifier may be a multiplier, additional points, additional virtual currency, etc. awarded to the player. In some embodiments, the gaming system adjusts the back-bets modifier based on the quantity of back bets placed with respect to the particular player and/or the quantity of back-betters placing bets with respect to the particular player.

In some embodiments, promotions, such as slot tournaments, happen periodically and players can be ranked by their performance in the promotion, such as the amount of money won during the promotion, the number of games played during the promotion, and/or the number of bonus features hit during the promotion.

It should be appreciated that the central display 200 and/or the leaderboard 210 may be any suitable type of display device and/or may include a plurality of display devices. While the leaderboard, in this example embodiment, is displayed via a central display, it should be appreciated that in other embodiments, the leaderboard may additionally or alternatively be displayed via a top box, a service window, a game window, and/or an overhead display, such as a community display.

In some embodiments, if a gaming environment includes a plurality of leaderboards, the gaming system randomly selects a player to award the secondary benefit from one of the leaderboards, a plurality of the leaderboards, or all of the leaderboards included in the gaming environment. For example, if the gaming environment includes three leaderboards each having five respective ranked positions, the gaming system first randomly selects the first leaderboard, the second leaderboard or the third leaderboard, and then selects a player who is ranked and displayed on the respective leaderboard to award the secondary benefit. The gaming system may assign the players associated with the selected leaderboard equal probabilities of being selected (e.g., a one-in-five chance of being selected) or may assign the players with weighted probabilities (e.g., based on their respective ranking positions on the selected leaderboard).

In some examples, the gaming system first randomly selects two of the leaderboards and then selects a player who is associated with (e.g., ranked and displayed on) the selected leaderboards to award the secondary benefit. The gaming system may assign the players associated with the selected leaderboards equal probabilities of being selected (e.g., a one-in-ten chance of being selected) or may assign the players associated with the selected leaderboards with weighted probabilities (e.g., based on their respective ranking positions on the selected leaderboards). For example, the gaming system assigns the respective players associated with the first ranked position on each of the two selected leaderboards with a fifteen percent chance of being randomly selected, assigns the respective players associated with the second ranked position on each of the two selected leaderboards with a 12.5 percent chance of being randomly selected, etc.

In some examples, the gaming system first selects all three of the leaderboards and then selects a player who is associated with (e.g., ranked and displayed on) the selected leaderboards to award the secondary benefit. The gaming system may assign the players associated with the selected leaderboards equal probabilities of being selected (e.g., a one-in-fifteen chance of being selected) or may assign the players associated with the selected leaderboards with weighted probabilities (e.g., based on their respective ranking positions on the selected leaderboards). For example, the gaming system assigns the respective players associated with the first ranked position on each of the three selected leaderboards with a ten percent chance of being randomly selected, assigns the respective players associated with the second ranked position on each of the three selected leaderboards with a 25/3 percent chance of being randomly selected, etc.

In some embodiments, if a player is associated with two or more of the leaderboards, the gaming system assigns a probability of being randomly selected for the secondary benefit based on a sum of their respective probabilities (e.g., equal probabilities and/or weighted probabilities) associated with each of the leaderboards.

In some embodiments, if a gaming environment includes a plurality of leaderboards, the gaming system randomly selects respective players to award the secondary benefit to for each of the leaderboards, for a plurality of the leaderboards, or for all of the leaderboards. For example, a gaming environment may include three leaderboards associated with slots games and three leaderboards associated with poker games. In some such examples, the gaming system randomly selects respective players to award the secondary benefit to for each of the six leaderboards (e.g., randomly select six players), randomly selects a player to award a secondary benefit to from the three leaderboards associated with the slots games (e.g., randomly select one player), randomly selects a player to award a secondary benefit to from the three leaderboards associated with the poker games (e.g., randomly select one player), randomly selects a first player to award a first secondary benefit to from the three leaderboards associated with the slots games and randomly selects a second player to award a second secondary benefit to from the three leaderboards associated with the poker games (e.g., randomly select two players), or may randomly select a player from the six leaderboards (e.g., randomly select one player).

Alternative Embodiments

It should be appreciated that in different embodiments, one or more of:

i. a quantity of ranked positions displayed on the leaderboard;
ii. which information is displayed on the leaderboard;
iii. a quantity of ranking components used to rank the players;
iv. which ranking component(s) are used to rank the players;
v. when a leaderboard benefit event occurs;
vi. a duration (in time and/or in quantity of games played) with which to associate the leaderboard benefit event;
vii. what benefit to provide in response to a leaderboard benefit event occurring;
viii. when a leaderboard re-ranking event occurs; and/or
ix. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a sports betting terminal, an electronic table game terminal, a terminal associated with a play of a table game at a gaming table remote from the terminal, a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, a central controller, and/or a remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
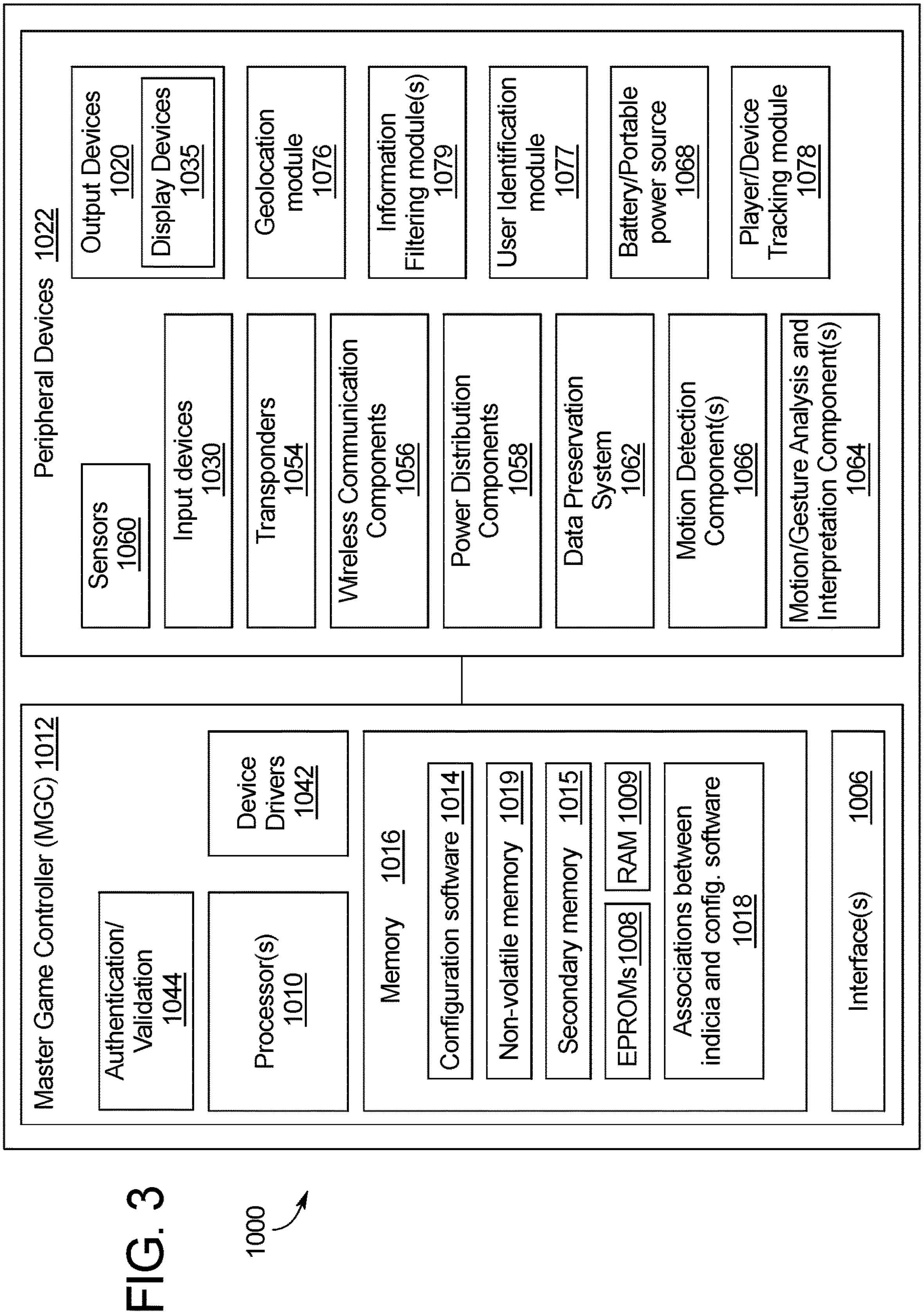
FIG. 3 is a schematic block diagram of one embodiment of an electronic configuration of an example gaming system disclosed herein.
Figure 4A:
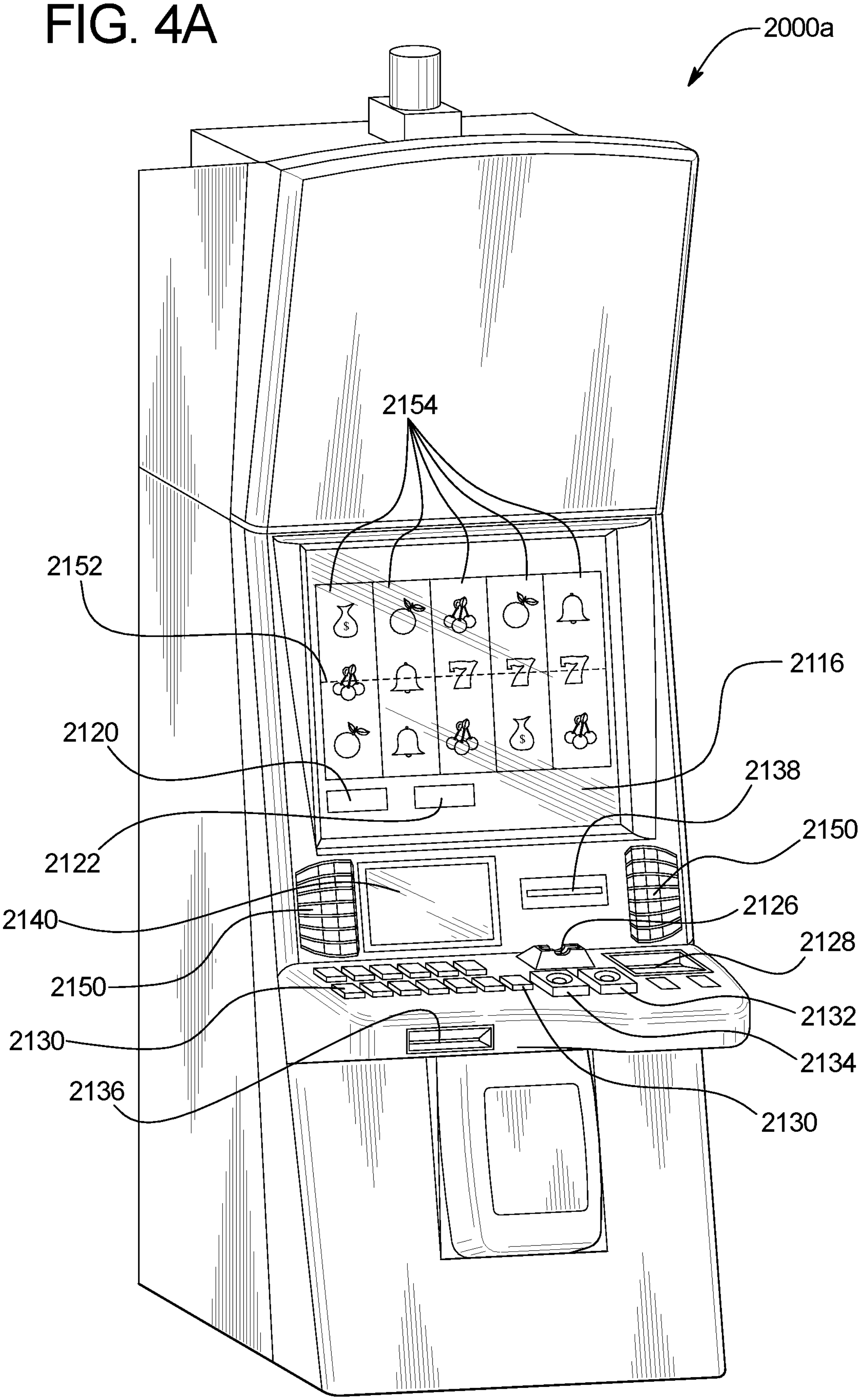
FIGS. 4A and 4B are perspective views of example alternative embodiments of the gaming system disclosed herein.
Figure 4B:
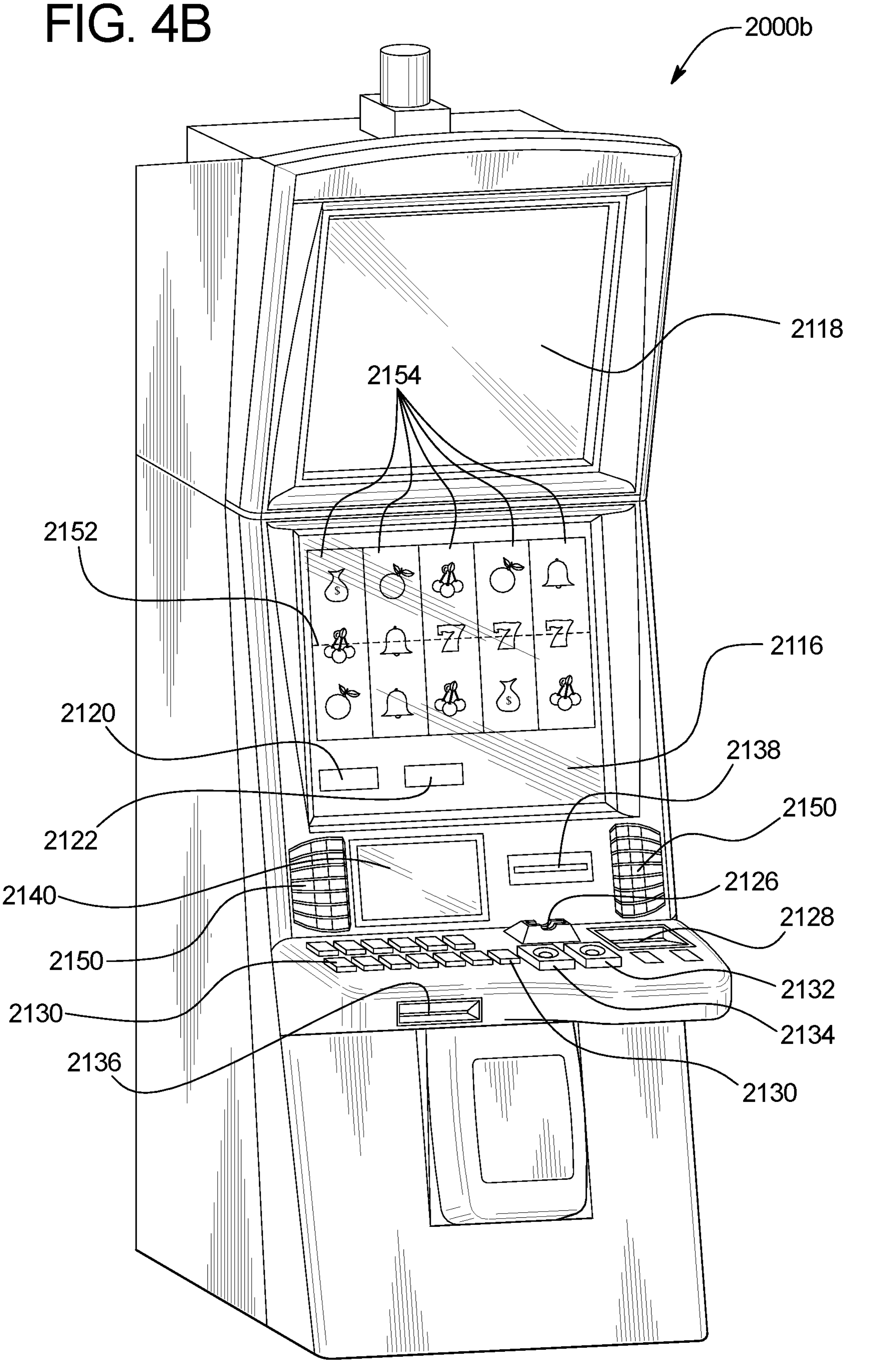
Figure 4C:
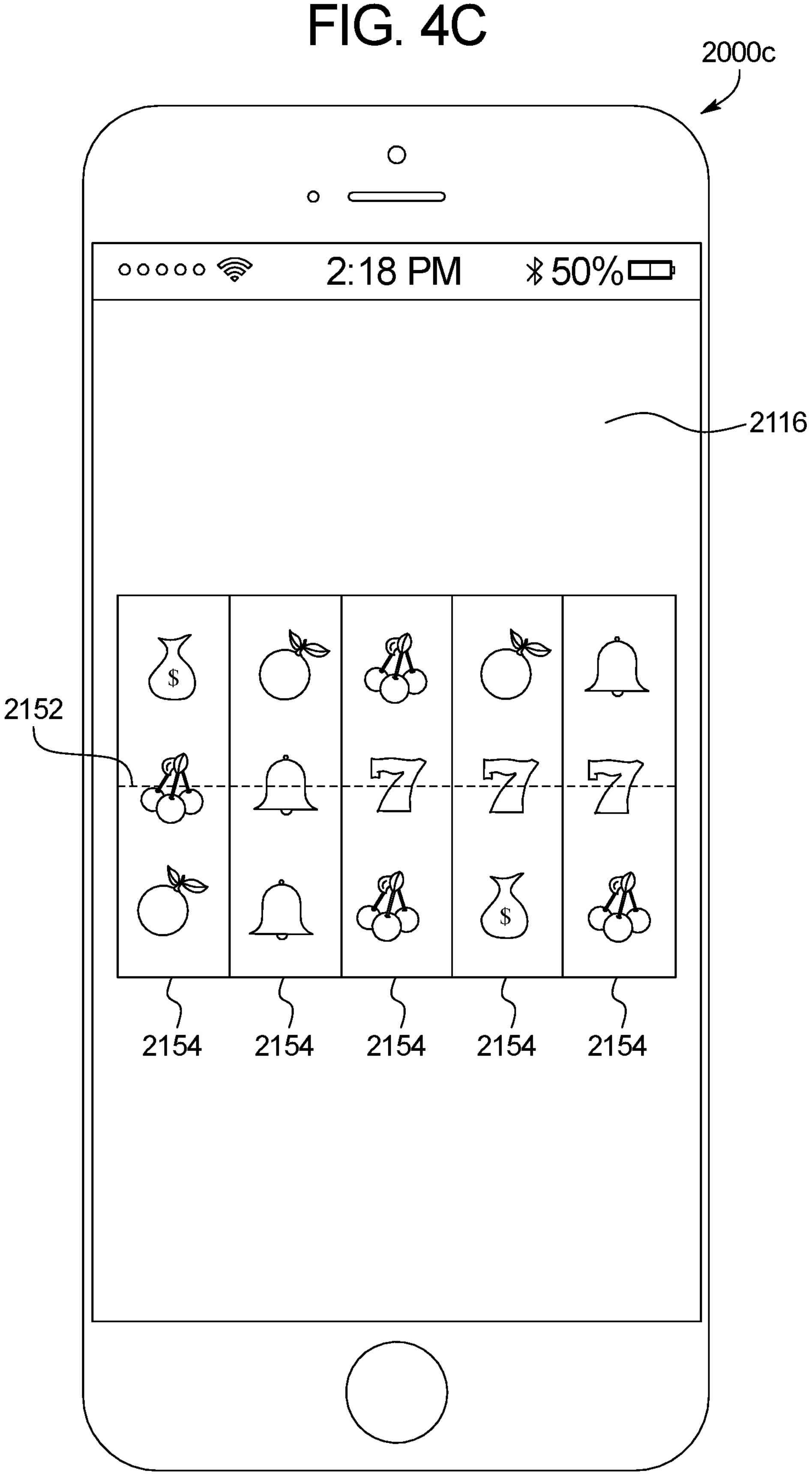
FIG. 4C is a front view of an example personal gaming device of the gaming system disclosed herein.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method."

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game."

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern."

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 4B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations."

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, and/or a facial recognition sensor), and/or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, and/or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines and/or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity."

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network server to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents in a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention is claimed as follows:

1. An electronic gaming machine comprising:

a housing comprising an access door;

a security monitoring circuit supported by the housing;

a processor; and a memory device that stores a plurality of instructions that, when executed by the processor, cause the processor to:

cause a display device to display a plurality of ranked positions and a player identifier associated with at least one of the ranked positions, cause the display device to display an opportunity for a general player to place a wager on a total duration the player identifier will be associated with the at least one of the ranked positions, and responsive to the wager being placed and following an opening of the access door being detected via the security monitoring circuit:

store data associated with a display state of the electronic gaming machine comprising the plurality of ranked positions and the player identifier associated with the at least one of the ranked positions, disable any determination of whether the player identifier was associated with the at least one of the ranked positions for at least the wagered on total duration, and following at least a closing of the access door detected via the security monitoring circuit:

load the stored data to reconstitute the display state of the electronic gaming machine, enable a determination of whether the player identifier was associated with the at least one of the ranked positions for at least the wagered on total duration, and responsive to the determination being that the player identifier was associated with the at least one of the ranked positions for at least the wagered on total duration, cause the display device to display an award for the general player.

2. The electronic gaming machine of claim 1, wherein the award comprises a first amount based, at least in part, on a first total duration the player identifier was associated with a first ranked position over a period of time, and the award comprises a second, different amount based, at least in part, on a second, different total duration the player identifier was associated with the first ranked position over the period of time.

3. The electronic gaming machine of claim 2, wherein the award comprises a third amount based, at least in part, on the first total duration the player identifier was associated with a second ranked position, the third amount being different from the first amount.

4. The electronic gaming machine of claim 1, wherein the award comprises a first amount based, at least in part, on a first total duration the player identifier was associated with a first ranked position over a quantity of games played, and the award comprises a second, different amount based, at least in part, on a second, different total duration the player identifier was associated with the first ranked position over the quantity of games played.

5. The electronic gaming machine of claim 4, wherein the award comprises a third amount based, at least in part, on the first total duration the player identifier was associated with a second ranked position, the third amount being different from the first amount.

6. The electronic gaming machine of claim 1, wherein the memory device stores a plurality of further instructions that, when executed by the processor, cause the processor to cause the display device to display a ranked position movement notification associated with the player identifier.

7. The electronic gaming machine of claim 1, wherein at each point in time of the total duration, the ranked position associated with the player identifier is based on at least one event occurring in association with that point in time.

8. The electronic gaming machine of claim 1, wherein at each point in time of the total duration, the ranked position associated with the player identifier is based on a plurality of events that occurred over the total duration.

9. The electronic gaming machine of claim 1, wherein the general player is associated with the player identifier prior to the wager being placed.

10. An electronic gaming machine comprising:

a housing comprising an access door;

a security monitoring circuit supported by the housing;

a processor; and a memory device that stores a plurality of instructions that, when executed by the processor, cause the processor to:

cause a display device to display a leaderboard comprising at least a first ranked position associated with a first player identifier and a second, different ranked position associated with a second, different player identifier, cause the display device to display an opportunity for a general player to place a wager associated with an activity of the leaderboard, the general player being distinct from any player associated with any player identifier associated with any of the ranked positions, and responsive to the wager being placed and following an opening of the access door being detected via the security monitoring circuit:

store data associated with a display state of the electronic gaming machine comprising at least the first ranked position associated with the first player identifier and the second, different ranked position associated with the second, different player identifier, disable any determination of whether the wagered on activity of the leaderboard occurred, and following at least a closing of the access door detected via the security monitoring circuit:

load the stored data to reconstitute the display state of the electronic gaming machine, enable a determination of whether the wagered on activity of the leaderboard occurred, and responsive to the determination being that the wagered on activity of the leaderboard occurred, cause the display device to display an award for the general player.

11. The electronic gaming machine of claim 10, wherein the wager associated with the activity of the leaderboard comprises any of: a wager on a length of time the first player identifier will remain associated with the first ranked position, a wager on a quantity of games the first player identifier will remain associated with the first ranked position, a wager on a length of time the second, different player identifier will remain associated with the second, different ranked position, a wager on a quantity of games the second, different player identifier will remain associated with the second, different ranked position, a wager on a duration before a third player identifier is associated with the first ranked position, and a wager on a duration before the third player identifier is associated with the second, different ranked position.

12. A method of operating an electronic gaming machine, the method comprising:

displaying, by a display device, a plurality of ranked positions and a player identifier associated with at least one of the ranked positions, displaying, by the display device, an opportunity for a general player to place a wager on a total duration the player identifier will be associated with the at least one of the ranked positions, and responsive to the wager being placed and following an opening of the access door being detected via the security monitoring circuit:

storing, by a processor, data associated with a display state of the electronic gaming machine comprising the plurality of ranked positions and the player identifier associated with the at least one of the ranked positions, disabling, by the processor, any determination of whether the player identifier was associated with the at least one of the ranked positions for at least the wagered on total duration, and following at least a closing of the access door detected via the security monitoring circuit:

loading, by the processor, the stored data to reconstitute the display state of the electronic gaming machine, enabling, by the processor, a determination of whether the player identifier was associated with the at least one of the ranked positions for at least the wagered on total duration, and responsive to the determination being that the player identifier was associated with the at least one of the ranked positions for at least the wagered on total duration, displaying, by the display device, an award for the general player.

13. The method of claim 12 wherein the award comprises a first amount based, at least in part, on a first total duration the player identifier was associated with a first ranked position over a period of time, and the award comprises a second, different amount based, at least in part, on a second, different total duration the player identifier was associated with the first ranked position over the period of time.

14. The method of claim 13, wherein the award comprises a third amount based, at least in part, on the first total duration the player identifier was associated with a second ranked position, the third amount being different from the first amount.

15. The method of claim 12, wherein the award comprises a first amount based, at least in part, on a first total duration the player identifier was associated with a first ranked position over a quantity of games played, and the award comprises a second, different amount based, at least in part, on a second, different total duration the player identifier was associated with the first ranked position over the quantity of games played.

16. The method of claim 15, wherein the award comprises a third amount based, at least in part, on the first total duration the player identifier was associated with a second ranked position, the third amount being different from the first amount.

17. The method of claim 12, further comprising displaying, by the display device, a ranked position movement notification associated with the player identifier.

18. The method of claim 12, wherein at each point in time of the total duration, the ranked position associated with the player identifier is based on at least one event occurring in association with that point in time.

19. The method of claim 12, wherein at each point in time of the total duration, the ranked position associated with the player identifier is based on a plurality of events that occurred over the total duration.

20. The method of claim 12, wherein the general player is associated with the player identifier prior to the wager being placed.

* * * * *